US012767264B2

(12) United States Patent
Henig et al.

(10) Patent No.: US 12,767,264 B2
(45) Date of Patent: Oct. 20, 2026

(54) BICYCLE COMPONENT WITH A COCKPIT UNIT

(71) Applicant: DT SWISS INC., Grand Junction, CO (US)

(72) Inventors: Andreas Henig, Biel (CH); Lukas Kuhn, Lengnau (CH); Marcus Kern, Wangen an der Aare (CH)

(73) Assignee: DT SWISS INC., Grand Junction, CO (US)

( * ) Notice: Subject to any disclaimer, the term of this patent is extended or adjusted under 35 U.S.C. 154(b) by 0 days.

(21) Appl. No.: 19/191,038

(22) Filed: Apr. 28, 2025

(65) Prior Publication Data

US 2025/0333134 A1 Oct. 30, 2025

(30) Foreign Application Priority Data

Apr. 29, 2024 (DE) ......................... 102024112018.5

(51) Int. Cl.
*B62K 21/16* (2006.01)

(52) U.S. Cl.
CPC .................................... *B62K 21/16* (2013.01)

(58) Field of Classification Search
None
See application file for complete search history.

(56) References Cited

U.S. PATENT DOCUMENTS

| | | | | |
|---|---|---|---|---|
| 4,682,509 A * | 7/1987 | Takamiya | B62K 21/16 74/551.5 |
| 2004/0182194 A1 | 9/2004 | Chiang | |

FOREIGN PATENT DOCUMENTS

| | | | | |
|---|---|---|---|---|
| CN | 214451598 U | 10/2021 | |
| CN | 217575483 U | 10/2022 | |
| DE | 102016105823 A1 | 10/2017 | |
| DE | 102022130511 B3 | 10/2023 | |
| EP | 2308749 B1 | 6/2017 | |
| GB | 410825 A * | 5/1934 | B62K 21/16 |
| GB | 2615286 A | 8/2023 | |
| WO | WO-2009148266 A2 * | 12/2009 | B62K 21/16 |

OTHER PUBLICATIONS

Search Report received for German Application No. 102024112143.2, dated Jan. 27, 2025.

* cited by examiner

*Primary Examiner* — Vicky A Johnson
(74) *Attorney, Agent, or Firm* — Greer, Burns & Crain, Ltd

(57) ABSTRACT

A bicycle component including a cockpit unit with at least two cockpit modules. A first cockpit module is designed as a stem module. A second cockpit module is designed as a handlebar module. The cockpit modules can be coupled with each other in different ways to enable different seating positions with the cockpit unit. One of the cockpit modules includes an insertion part and one of the cockpit modules includes a receptacle part. The insertion part can be inserted into the receptacle part and can be connected to the insertion part in at least two different relative positions in order to provide two different operating geometries with the cockpit unit by assembling differently. A third cockpit module is arranged between the first and second cockpit modules and surrounds the first and/or second cockpit module in sections.

21 Claims, 8 Drawing Sheets

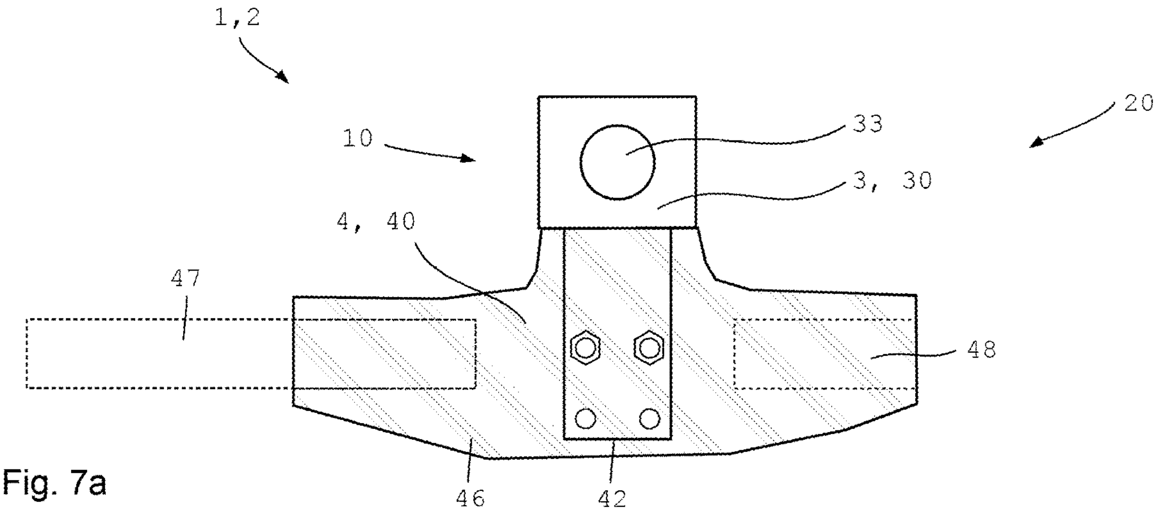
Fig. 7a
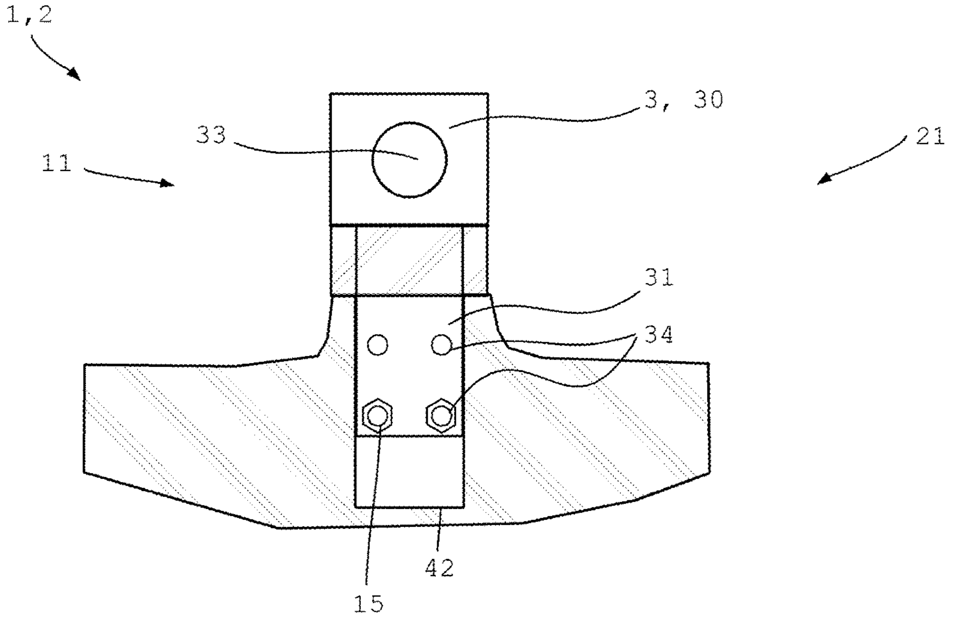
Fig. 7b
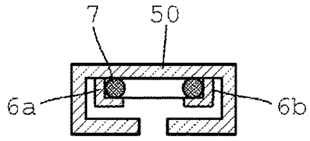
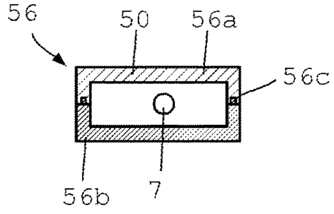
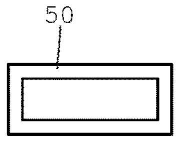
Fig. 8a
Fig. 8b
Fig. 8c

BICYCLE COMPONENT WITH A COCKPIT UNIT

BACKGROUND

The present invention relates to a bicycle component with a cockpit unit for vehicles that are at least partially muscle-powered during regular and normal operation, and, in particular, bicycles. The cockpit unit comprises at least two cockpit modules, wherein a first cockpit module is designed as a stem module and wherein a second cockpit module is designed as a handlebar module. To enable different seating positions, the cockpit modules can be coupled with each other in different ways. By selecting the mounting position, a desired operating geometry can be provided.

A wide variety of bicycle components and cockpit units are known from prior art.

Not only in the competition sector, but also in the amateur sector, the requirements for athletic bicycles have increased enormously in recent years. Every gram of weight counts and the appearance and design are also considered important. To reduce weight, various components are made of fibre composite material as a single piece, and, in order to improve the look and design, cables and cable pulls are often routed inside the frame and handlebars.

By integrating different parts, weight can be reduced by eliminating the need for connection points. In addition, the integration option of a cable guide is facilitated. However, the disadvantage of integrating different parts and components and manufacturing them from a fibre composite is that different sizes, widths, lengths and geometries require different tools for the production of fibre-reinforced components. This increases the costs enormously.

Solutions have therefore become known in which a modular design of a handlebar stem and a bicycle handlebar is possible.

EP 2 308 749 B1 discloses a handlebar stem for bicycle handlebars, wherein a first clamping element is provided for connecting to a steerer tube and a second clamping element for holding a separate handlebar and an intermediate element arranged between the clamping elements, which is fixed using a retaining element that tensions the two clamping elements together. This allows an interchangeable intermediate element to be inserted, which allows the length to be adjusted. The system basically functions. However, the disadvantage is that a normal stem is provided that does not provide for a uniform cockpit, and another disadvantage entails that if the geometry is changed, the intermediate part must be replaced and any cables already laid in it must be completely rerouted, as these have to be routed through the intermediate element. Another disadvantage is that the clamping elements and the intermediate element are screwed together in the longitudinal direction via a screw. If this screw loosens even a little during operation, the stability in the longitudinal direction but also in the transverse direction decreases considerably. This is not favourable for a component that is so relevant for safety. The steering behaviour and driving behaviour become unsafe.

With the GB 2 615 286 B, an integrated system or a stem and handlebar assembly for a bicycle has become known. The system comprises a stem that extends along a longitudinal axis and has a first stem section and a second stem section, wherein one of the stem sections comprising a rail that can be inserted into a receptacle of the other stem section. Spacers can be placed on the rail between the stem sections, which allow the length of the stem body to be adjusted. The stem sections are connected via a continuous screw in the longitudinal direction, so that even with this prior art, the stability of the connection depends on the screw tension. To secure the screw connection in the event of failure, vertical pins are also included, which are guided in the longitudinal direction on the side of the rail and are held in place at the end by a widened point. This prevents the handlebar assembly from falling off completely in the event of loosening of the screw connection. But a backlash-free connection in the longitudinal direction cannot be ensured. It will also be possible to rotate slightly around the longitudinal axis, so that when driving off-road or on cobblestones, there will be an unsafe feeling if the screw connection should loosen.

In the case of DE 10 2016 105 823 A1, a stem for a two-wheeler has become known, in which the handlebar device is adjustable mounted on the stem in a longitudinal direction. In order to achieve this, the handlebars can be fixed in different positions on an adjustment section along the stem. This stem basically works and allows for a length adjustment or an adjustment of the handlebar position in the longitudinal direction of the bike, wherein the total length always remains the same.

Similarly, DE 10 2022 130 511 B3 discloses a stem for a bicycle to accommodate a set of handlebars, in which recesses are formed on the stem so that the handlebars can be attached to the stem in different longitudinal positions, wherein the total length also remains unchanged here.

Similar to EP 2 308 749 B1, CN 217575483 U discloses a stem that can be changed in length, in which intermediate parts are inserted and braced overall.

CN 214451598 U also discloses a set of handlebar whose height position can be changed via insertable intermediate parts. Here as well, there is the disadvantage that, if the handlebar height is subsequently changed, an integrated cable guide must first be dismantled in order to insert an intermediate part.

It is therefore the object of the present invention to provide a bicycle component with a cockpit unit that provides for a uniform impression and can be flexibly modified, thereby making safe operation possible. In particular, at least minor changes to the geometry are possible during assembly or even afterwards.

SUMMARY

A bicycle component according to the invention is intended for at least partially muscle-powered bicycles and comprises a cockpit unit with at least two cockpit modules (in particular, separate and connectable to each other) successively arranged in a longitudinal direction. A first cockpit module is designed as a stem module. A second cockpit module is designed as a handlebar module. The cockpit modules can be coupled and/or connected to each other in different ways to enable different operating geometries with the cockpit unit. In particular, this enables different mounting positions and thus seating positions on a bicycle equipped with it. At least one of the cockpit modules comprises at least one insertion part and at least one or the other of the cockpit modules comprises at least one receptacle part. The insertion part can be inserted into the or at least one receptacle part and can be coupled and/or connected to the insertion part in at least two different relative positions in order to provide at least two different operating geometries with the cockpit unit on a bicycle (by assembling differently). The insertion part and the receptacle part each comprise at least two fastening holes arranged transversely to the longitudinal direction for fastening by means of a fastening part. At least one of the insertion part and the receptacle part comprises at least two fastening holes offset in the longitudinal direction for fastening by means of the fastening part. This means that the insertion part and/or the receptacle part comprises at least two fastening holes offset in the longitudinal direction for fastening by means of the fastening part.

The "longitudinal direction" here is the "normal" longitudinal direction of a bicycle. This is typically the case when the steering device is in the middle position.

In particular, a (separate) fastening part may be provided for each fastening hole. Or, for example, a fastening part comprises two fastening elements, one of which is then inserted into a fastening hole. It is possible that only the insertion part or only the receptacle part comprises at least two fastening holes offset in the longitudinal direction. It is also possible that the insertion part and the receptacle part each comprise at least two fastening holes offset in the longitudinal direction.

The bicycle component according to the invention has many advantages. A considerable advantage of a bicycle component with a cockpit unit according to the invention is that two cockpit modules can be connected differently with each other and a uniform impression remains. A pre-existing connection between the two cockpit modules does not have to be solved in a tedious manner. Since the insertion part of one cockpit module can be inserted into the receptacle part of the other cockpit module in two different depth insertion positions, the two cockpit modules can be connected to each other in two different relative positions or insertion positions. This provides at least two different operating or mounting positions with the cockpit unit. The operating geometry can be changed. It is essential that the cockpit modules are connected (and the cockpit modules are attached to each other) transversely to the longitudinal direction. As a result, the driver's sense of safety and the stability of the connection do not depend on the connecting force of the safety components.

To change the operating geometry, it is generally sufficient to transfer the two cockpit modules from one relative position to the other. The two relative positions differ in that the insertion depth of the insertion part of one cockpit module into the receptacle part of the other cockpit module differs. This changes the operating geometry. The position of the handlebars in the longitudinal direction of the bike changes relative to the stem module.

Where applicable, any existing cable guide, a cable pull, a (hydraulic) brake line, a Bowden cable or, for example, an electrical cable inside the cockpit unit, which is routed through a cavity in the cockpit unit, does not have to be removed from the interior in order to change the relative positions. In particular, this makes it possible to make a change without having to dismantle any existing cable, where applicable, a cable guide or a cable hoist or the like.

In preferred embodiments, the bicycle component forms a uniform cockpit for a bicycle, which provides for the functionality of a stem device and a handlebar device.

In particular, the stem module is designed as a single piece. In favourable embodiments, the insertion part is designed as a single piece on the stem module. Preferably, the handlebar module is designed as a single piece. Particularly preferably, the handlebar module comprises a base body and a set of handlebars formed with it as a single piece. Preferably, the receptacle part is designed as a single piece on the handlebar module. In particularly favourable embodiments, the insertion part of the stem module extends into the receptacle part of the handlebar module in all (mounted) relative positions and is connected to it there.

In the case of an inverted embodiment, the insertion part is designed as a single piece on the handlebar module. The handlebar module then comprises a base body and a set of handlebars formed with it as a single piece. The receptacle part is then designed as a single piece on the stem module. Then, in all intended and mounted relative positions, the insertion part of the handlebar module projects into the receptacle part of the stem module and is connected to it there.

In all embodiments, the insertion part can preferably be inserted into the receptacle part or into a receptacle part at at least two different depths and that it can be fixed there. Three or a plurality of different depths are also possible.

In preferred embodiments, at least one third cockpit module is arranged or accommodated between the first cockpit module and the second cockpit module. The third cockpit module can form an intermediate part or an intermediate piece. It is preferable that the third cockpit module surrounds the first cockpit module and/or the second cockpit module at least in sections.

In preferred embodiments and further embodiments, the third cockpit module forms a spacer between the first cockpit module and the second cockpit module. It is possible and preferable that the third cockpit module ensures the positioning of the (other two) cockpit modules relative to each other. This ensures easy and safe assembly. The third cockpit module is then designed in particular as an intermediate part and can form a cover. As a result, the cockpit unit appears to be a single piece overall, making an attractive and high-quality design possible. Simultaneously, the cockpit unit comprises a modular design and offers the (adjustment) options of a multi-part stem-handlebar combination. The cockpit unit is more visually appealing and aerodynamic. Less dirt accumulates. The risk of injury is lower.

In preferred embodiments, the third cockpit module comprises a (at least) two-part housing. At least two of the housing parts are connected to each other and, for example, they are latched. However, it is also possible that individual or all housing parts are glued together.

If, for example, after an initial assembly, the user wants to change the operating geometry of the cockpit unit and change the relative position of the cockpit modules to each other, he/she can change the insertion depth of the insertion part into the receptacle part of the other cockpit module and, for example, reduce it. The resulting recess can be covered by a third cockpit module, which is plugged in or also glued on. If the user later wants to change the operating geometry back again, he/she can remove the third cockpit module or the housing of the same and change the insertion position accordingly.

To increase stability, in particular, at least two cockpit modules can be coupled to each other in a positive-locking manner. To do this, the insertion part of one cockpit module can be inserted precisely into the receptacle part of the other cockpit module.

It is possible and preferable that at least one cockpit module comprises at least one guide bar (or at least one guide rib) that projects from the cockpit module and, when connected as intended, engages with a guide groove of another cockpit module (preferably in a positive-locking manner). The guide bar can project outwards from the insertion part of a cockpit module. However, the guide bar can also project inwards within a receptacle part. The guide groove is designed accordingly so that a positive-locking bond is possible.

The use of positive-locking interlocking guide elements, such as guide bars and interacting guide grooves, can achieve a considerable gain in rigidity. A multi-part cockpit unit can be designed to be just as rigid as a one-piece cockpit unit.

By means of positive-locking guide elements, tension peaks in cockpit module fastening elements (screws/fastening holes/threads) can also be reduced or prevented.

In preferred embodiments, at least one cockpit module (inside) comprises at least one cable guide. Being particularly preferred, the cable guide enables length compensation when adjusting the cockpit unit. An extension of the cockpit unit does not have to be compensated for by extending the cable, rope or hydraulic line. A cable or an electrical or hydraulic line or the like does not have to be changed when the cockpit unit is adjusted.

For this purpose, the cable guide is laid in a zig-zag or in serpentine lines or spirals or the like, for example. This allows a length compensation to be made in the event of an extension or corresponding shortening. Appropriate guidance or fastening inside at least one cockpit module can reliably prevent rattling or noise generation.

In preferred embodiments, the third cockpit module is somewhat C-shaped. The third cockpit module can have a C-cross-section, for example. Then it can be possible to put it over via a cable and/or via the other two cockpit modules. The third cockpit module can then be made of an elastic material or can at least comprise an elastic area. A U- or V-shape (open at the bottom in particular) is also possible.

Preferably, at least two cockpit modules are glued together. It is also possible for at least two cockpit modules to be snapped together. It is also possible that the cockpit modules are snapped and glued together. In such embodiments, it is possible, in particular, to select and adjust a relative position or operating geometry or operating position once. For example, when buying a bicycle and adapting the operating geometry of the cockpit unit to the desired seating position.

However, the possibility of subsequent multiple changes to the relative position and the operating geometry is particularly preferred. For this purpose, it is preferred that at least two cockpit modules are screwed together.

It is also possible for two or a plurality of cockpit modules to be glued together. An adhesive for this can be, for example, a thermoplastic material or a thermoplastic fibre composite.

Other adhesives are also possible, such as two-component adhesives, which are mixed and activated by plugging them together. Then it is possible to adjust it for a certain period of time during assembly (initial assembly).

It is preferable that the gluing is carried out by authorized dealers or in the manufacturer's assembly plants. Then the quality can be guaranteed. It is also possible that special tools or equipment are used for this purpose, e.g., when using thermoplastic adhesives. When using special equipment, gluing by a normal end customer is not easily possible. However, various components or cockpit modules can be produced in one or a plurality of plants and assembled into a large number of different variants in other plants or workshops.

Preferably, screws are used to fix the two cockpit modules relative to each other. For this purpose, it is preferred that the stem module and the handlebar module each comprise at least one fastening hole for fastening by means of at least one fastening part. Preferably, the handlebar module is attached to the stem module by means of at least one fastening part.

It is preferable that at least one fastening hole is designed as a threaded hole. In favourable embodiment, the fastening part comprises at least one thread.

It is possible that at least one threaded hole is formed in an insertion part. It is also possible that a threaded hole or at least a threaded hole is formed in the receptacle part.

In favourable embodiments, two rows of two parallel fastening holes (and preferably threaded holes) are formed in at least one cockpit module. It is also possible that three or a plurality of longitudinally offset fastening holes (threaded holes) or rows of fastening holes (threaded holes) are provided.

In particular, there are (at least) two rows of two parallel threaded holes in the insertion part. In particular, two parallel fixation holes are formed in the receptacle part at the same axial height. This makes it easy to adjust the cockpit unit in two different axial positions.

Instead of fastening holes and threaded holes, fastening holes can also be provided in general, wherein a connection is established via screws (through screws) and nuts. Threaded holes can offer the advantage that a screw (within the scope of its intended use) projects into the cockpit module from below and is therefore not visible from the riding position or from above.

Fastening with two screws is more secure than using only one screw. In particular, two screws adjacent in the transverse direction are used for fastening.

When using two screws, a different design can be used. Then the size of the screws and/or a thread engagement length can be adjusted. The connection can become more secure without having to design the connection unnecessarily large and heavy for safety. This offers advantages.

It is possible to insert a continuous screw and a matching counterpart. A nut can also be inserted. The thread can also be present in a matching sleeve. It is also possible to screw from below and screw the screw into an internal thread in the "inner part" (insertion part). In all cases, the thread can be laminated for example. It is also possible that the screw is screwed in from above. Then the screw can be screwed into an internal thread in the insertion part for example. If the screw is screwed from above or below, it is favourable if the fit and design are such that the desired strengths are achieved.

In favourable embodiments, a length of the insertion part of a cockpit module is greater than ⅓ of the total length of the cockpit module. Preferably, a length of the insertion part of the stem module is greater than ⅓ of the length of the stem module. Preferably, a width of the insertion part of a cockpit module (the stem module) is greater than half the width of the cockpit module (or the stem module). The insertion part is a load-bearing component that transmits the forces and torques required during operation. This is also made clear by the dimensions relative to the cockpit modules (stem module and handlebar module).

In particularly preferred embodiments, there is at least one cockpit module and, in particular, the cockpit unit as a whole consists essentially or almost completely or completely of at least one fibre composite material or is made of it. It is possible, for example, that a metal threaded insert is inserted or integrated into the cockpit unit.

In favourable embodiments, the handlebar module forms at least one base body of a handlebar device. In particular, the handlebar module comprises at least one set of handlebars that is designed as a single piece on the handlebar module. It is also possible that the handlebar module includes at least one set of handlebars, which is interchangeably mounted on a receptacle on the handlebar module. Then it is also possible for two sets of handlebars to be connected to the side of the handlebar module.

A single-piece embodiment of the handlebar module with one set of handlebars is particularly favourable, which enables a particularly light and stable construction.

In all embodiments, it is particularly preferred that the stem module comprises at least one fastening section and preferably a clamping section for fastening to a steerer tube of a bicycle fork. It is also conceivable that the steerer tube forms a single-piece part of the bicycle component.

In all embodiments, it is preferred that the stem module comprises an insertion part and that the handlebar module comprises a receptacle part. The dimensions of the receptacle part of the handlebar module are adapted to the dimensions of the insertion part of the stem module. This makes it possible for the insertion part to be arranged at at least two different depths in the receptacle part and thus be attached.

In favourable embodiments, the third cockpit module surrounds the insertion part of one cockpit module in sections and plunges into the receptacle part of the other cockpit module. This allows the cockpit unit to be extended, wherein the third cockpit module then forms an intermediate part or intermediate piece, thereby assuming a load-bearing function.

In this case, the third cockpit module preferably has an insertion part for sliding into another cockpit module and a receptacle part for accommodating an insertion part of another cockpit module. In such embodiments, it is preferable that the third cockpit module changes an orientation of the first cockpit module relative to the second cockpit module. This allows for an angle, height, alignment or distance of the handlebars from the steerer tube.

The invention also makes it favourable to use cockpit modules of different types and/or load classes and, in particular, different ASTM classes (ASTM—American Society for Testing and Materials) in a cockpit unit. Classification is preferably done according to ASTM F2043, particularly ASTM F2043-13. A distinction is made between the load during use. For example, a uniform stem module can be used for all types. The handlebar module may differ, for example, for the intended use. Or vice versa. For example, a cockpit module is exposed to considerably greater loads when riding downhill than a cockpit module on a touring bike or a gravel bike. By using (partially) the same parts at different load levels (provided for in operation), production can be simplified and the variety of parts reduced. The highest load level provided for in operation is maintained by all cockpit modules. This can reduce costs while improving quality. It is also possible to use different fibre qualities for different applications for the production of cockpit modules made of fibre composite.

Particular preference is given to fastening parts and, in particular, fastening screws to be guided tightly in the fastening holes, at least in sections. This can even result in a kind of press fit. In particular, it is ensured that multiple connections and detachments are possible. If a sleeve (with internal thread) is inserted into one cockpit module and a screw (with, for example, precisely fitting cylindrical sections) is inserted into the other cockpit module, exact positioning and a secure connection can be guaranteed. This results in a perfect fit and perfect stability even if the screw tension is not optimal or has decreased. The stability of the connection is independent of the screw tension at the time of invention.

The screws can be inserted from above or below. The use of Fastening holes with blind holes is also possible.

Further advantages and features of the present invention result from the exemplary embodiments, which are explained below with reference to the enclosed figures.

BRIEF DESCRIPTION OF THE DRAWINGS

The figures show:

FIG. 7*a, b* two different relative positions of the bicycle component according to the invention;

FIGS. 8*a-c* strongly schematic cross-sections through a cockpit module;

DETAILED DESCRIPTION

Figure 1:
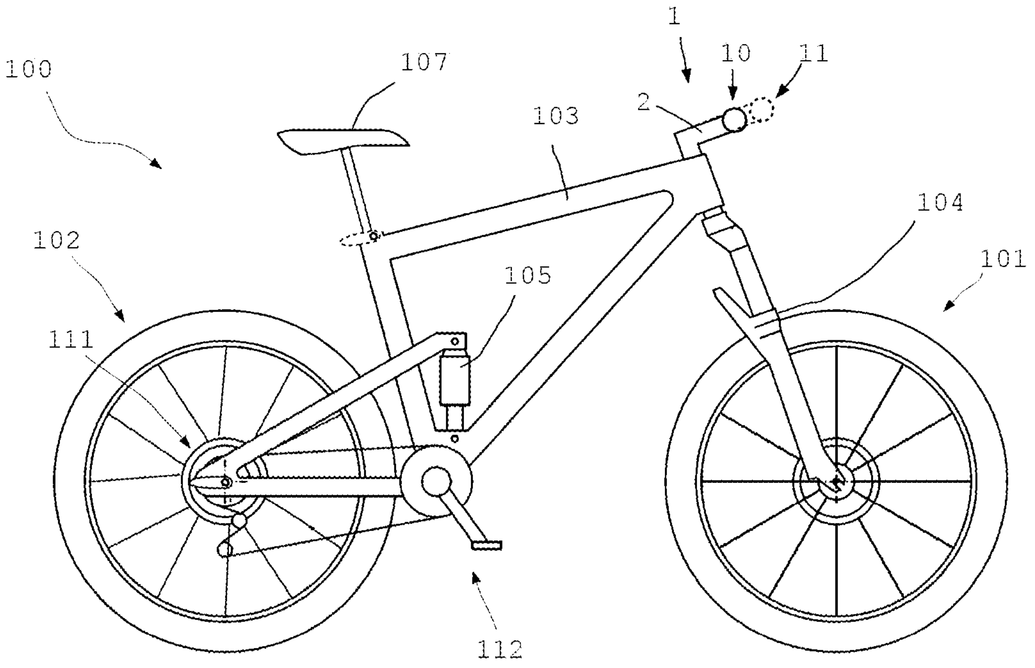
FIG. 1 a schematic illustration of a mountain bike.
Figure 2:
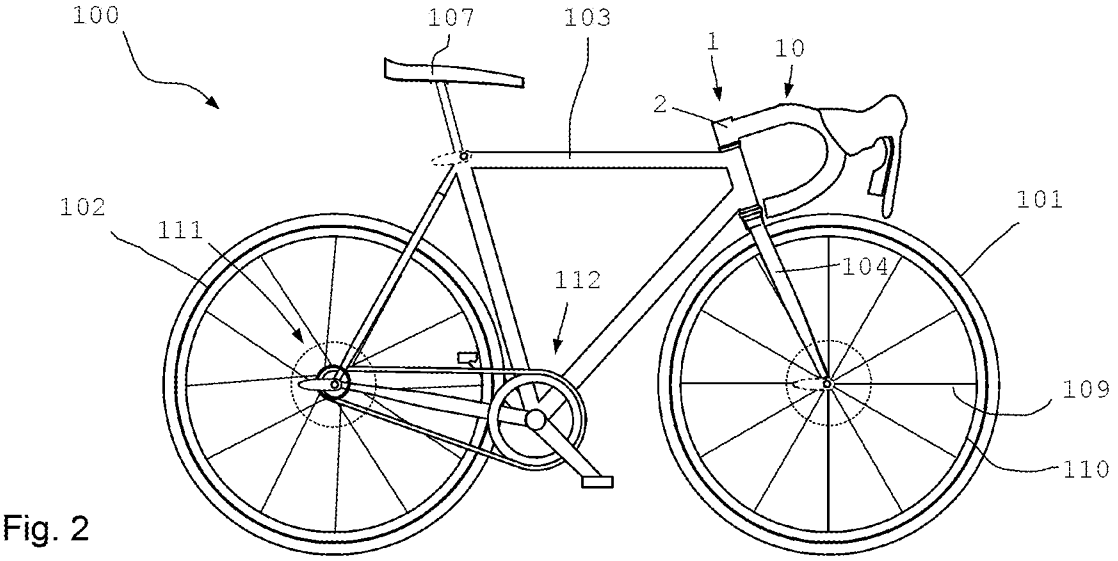
FIG. 2 a schematic illustration of a racing bike.

FIGS. 1 and 2 depict bicycles, each of which has bicycle components 1 according to the invention. The mountain bike or road bike or gravel bike 100 has a front wheel 101 and a rear wheel 102. On the rear wheel 102 there is a sprocket device 111. The two wheels 101, 102 comprise spokes 109 and a rim 110. Conventional rim brakes or also other brakes such as disc brakes can be provided.

A bicycle 100 comprises a frame 103, a cockpit unit 2 with a set of handlebars 47, a saddle 107, a fork or suspension fork 104 and, in the case of a mountain bike, a rear shock 105 can be provided. A pedal crank 112 with pedals serves as the drive. Where applicable, an electric auxiliary drive can be provided on the crank 112 and/or the wheels.

The cockpit unit 2 of bicycle component 1 comprises cockpit modules whose relative position in relation to each other can be adjusted. Schematically shown in FIG. 1 are two relative positions 10, 11. At the relative position 10, the set of handlebars are closer to saddle 107, as viewed in the longitudinal direction of the bicycle, than in the relative position 11, which is indicated in dashes. In the case of the racing bike 100 in FIG. 2, corresponding relative positions are provided analogously, wherein the uniform impression of the cockpit unit 2 remains. Different seating positions can be provided on the bicycle, depending on body height or preference. A uniform impression of cockpit unit 2 is retained. Constructive details of cockpit unit 2 are explained with reference to the other figures.

The bicycle components 1 used on the bicycles in accordance with FIGS. 1 and 2, each with a cockpit unit 2, can be designed, for example, as shown in FIGS. 3 and 4. FIG. 3 shows a schematic exploded illustration of three variants of a bicycle component 1 according to the invention obliquely from above, in which different cockpit modules 3-5 can be used.

Figure 3A:
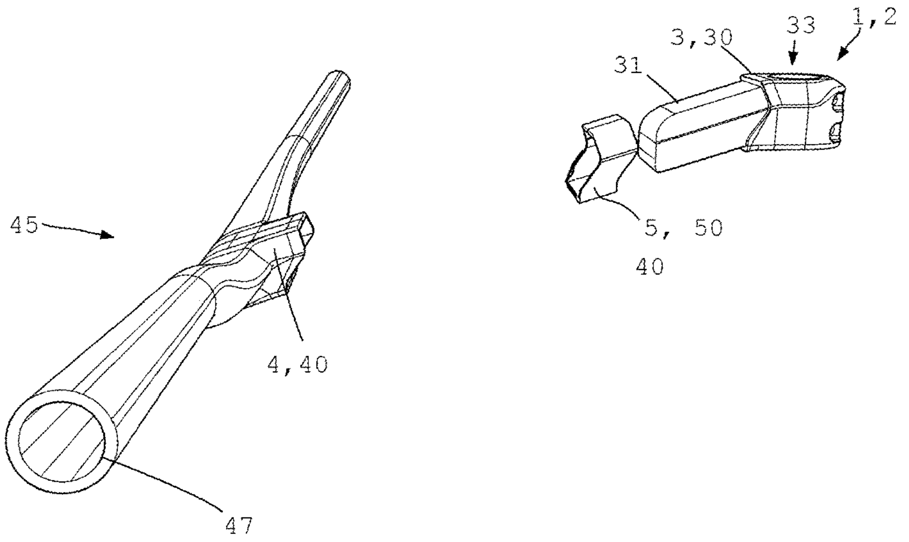
FIGS. 3*a*-3*c* schematic exploded illustrations of three variants of a bicycle component according to the invention obliquely from above.
Figure 3B:
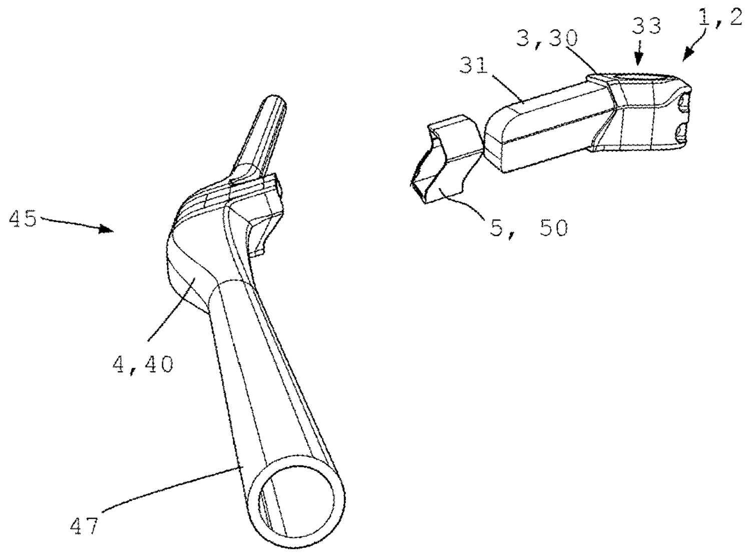
Figure 3C:
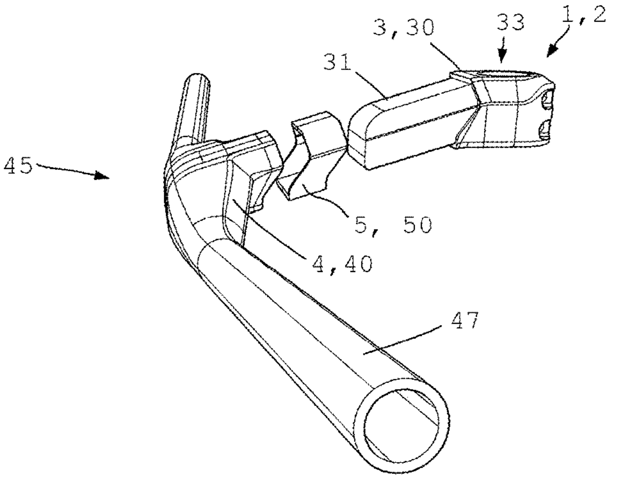

In FIGS. 3*a*-3*c*, the stem module 30 is identical as cockpit module 3 in all three variants shown. Three different handlebar modules 40 are shown, each of which can be used alternatively. With different combinations of cockpit modules 3 and 4 or stem modules 3 and handlebar modules 40, the geometry of cockpit unit 2 can be varied. This allows the height and orientation of the set of handlebars 47 to be changed. Handlebar modules of different widths can also be used.

For each cockpit unit 2 and thus each combination of cockpit modules 3 and 4, the length of the cockpit unit 2 can be varied in the longitudinal direction of a bicycle 100. This allows the distance of the set of handlebars 47 from the clamping section 3 to the clamping on a steerer tube of a bicycle fork to be changed for each cockpit unit 2. A cockpit module 5 inserted between cockpit modules 3 and 4 can be used to extend the length in a targeted manner. The composite cockpit unit 2 nevertheless gives a single-piece and uniform impression overall, although it consists of multiple parts. In a view from above, no connecting elements such as articulated connections or screws are usually visible.

Figure 4A:
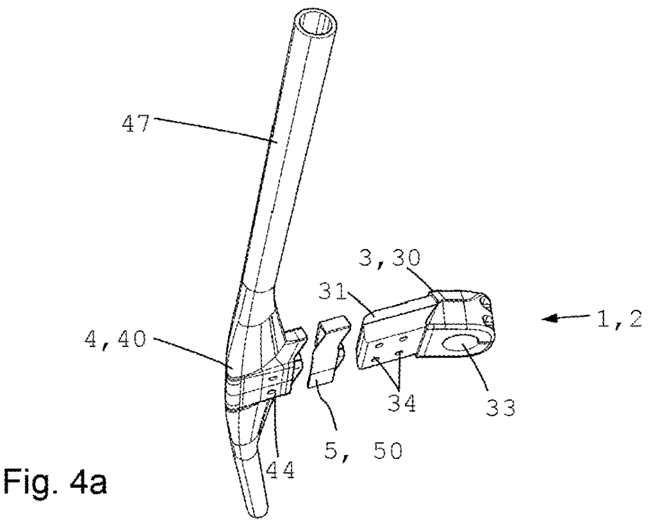
FIGS. 4*a*-4*c* schematic exploded views in accordance with FIG. 3 obliquely from below.
Figure 4B:
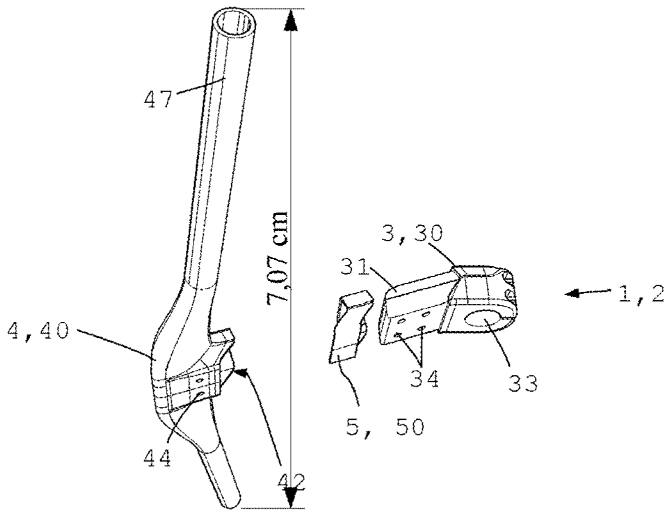
Figure 4C:
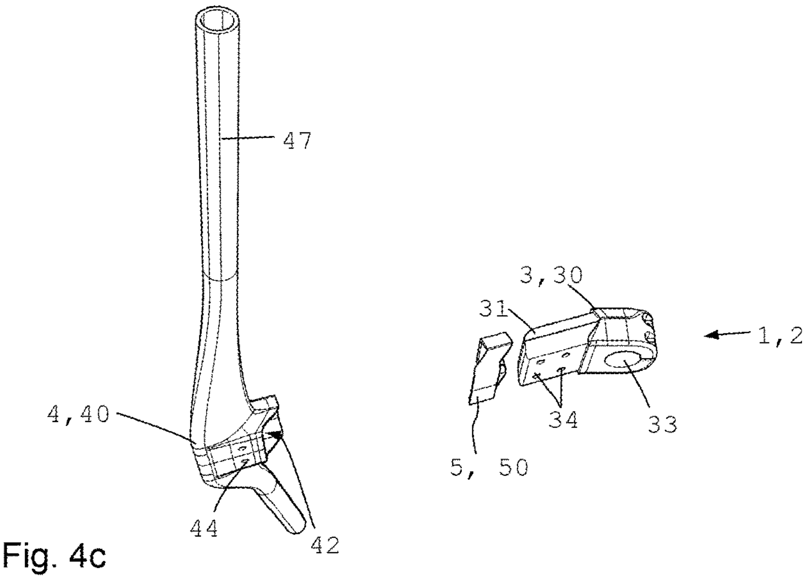

FIGS. 4*a*-4*c* show a view of FIGS. 3*a*-3*c* obliquely from below. Here you can see fastening holes 34, 44 in cockpit modules 3, 4, which are preferably used to fix cockpit modules 3, 4 to each other. Preferably, at least some of the fastening holes 34, 44 are designed as threaded holes. Then, the connection can be secured via a simple screw connection. It is also possible that the fastening holes 34, 44 (all) are designed as through holes. Then screws can be pushed through and screwed with nuts on the other side.

It is also possible that the cockpit modules are (only) glued together if only a selection of the cockpit modules is to be made a single time. Then fastening holes 34, 44 can be dispensed with. However, fastening holes 34, 44 can also be used for gluing to additionally secure the connection of the cockpit modules to each other. Where applicable, fastening holes 34, 44 can be used without threads, into which (simple metal) pins are inserted and glued.

Two rows of fastening holes 34 in the cockpit module 3 are evident here that are spaced from each other in the normal operating state in the longitudinal direction of the bicycle. This allows the cockpit module 3 to be fixed together with the cockpit module 3 in two different relative positions 10, 11.

It is also conceivable that the two cockpit modules 3, 4 could be glued together in more than two different relative positions 10, 11. A cockpit module 5 inserted between cockpit modules 3 and 4 ensures a defined distance and a uniform design.

The set of handlebars 47 can be arranged at two different distances from the cockpit module 3 or the stem module 30. Variants are possible in which the set of handlebars 47 extends outwards at a different distance and angle.

Figure 5:
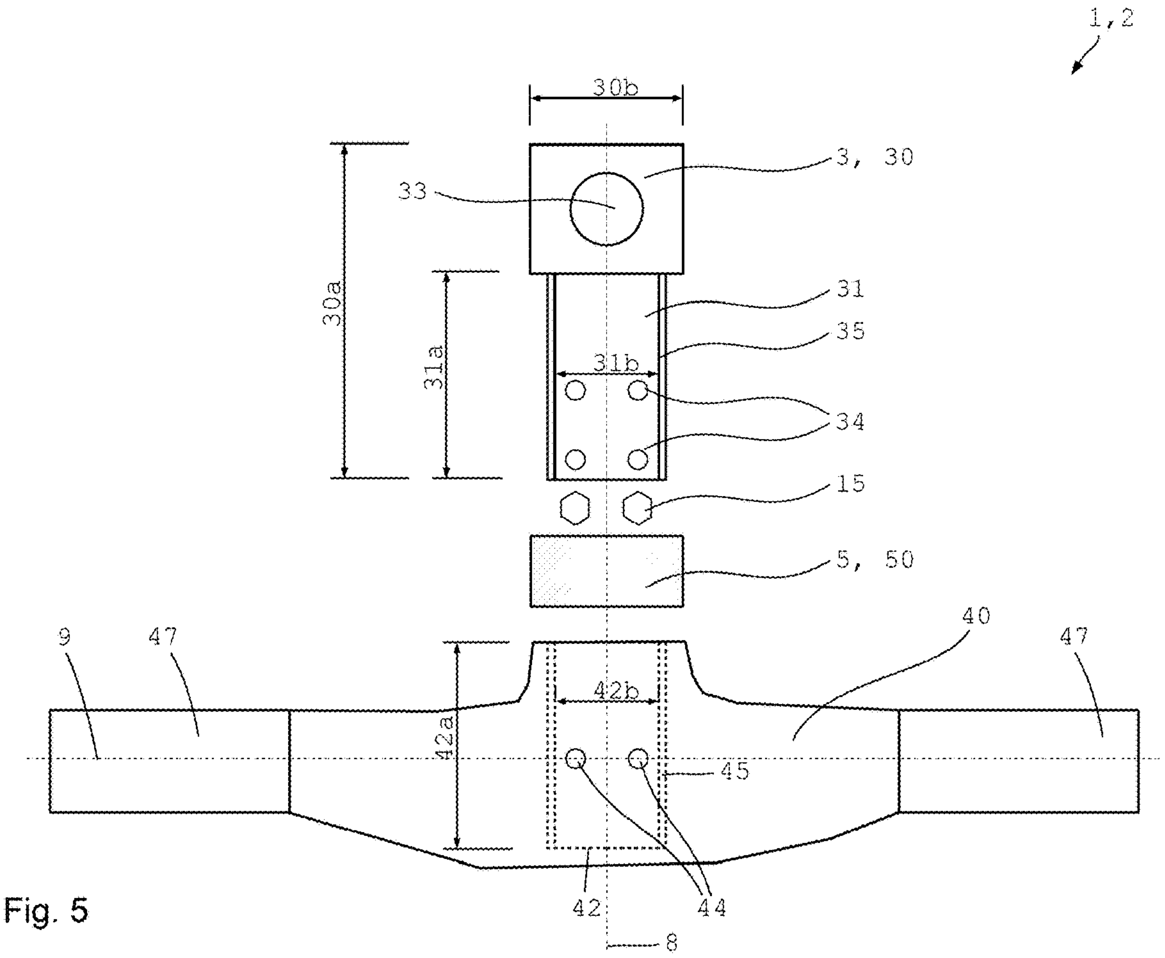
FIG. 5 a schematic exploded illustration of a bicycle component according to the invention.

FIG. 5 shows a schematic plan view of an exploded illustration of a bicycle component 1 that is designed as a cockpit unit 2 or has one.

The cockpit unit 2 comprises a cockpit module 3, a cockpit module 4 and a cockpit module 5. The cockpit module 3 is designed as a stem module 30 and comprises a fastening section and here, a clamping section 33 for clamping to a steerer tube of a bicycle fork. The cockpit module 4 is designed as the handlebar module 40 and comprises a base body 46 and a set of handlebars 47 formed here in a single piece, which extends on both sides from the central area of the handlebar module 40.

In the handlebar module 40, there is a dashed receptacle part 42, into which the insertion part 31 of the stem module 30 can be inserted and fixed there. The handlebar module 40 can be fixed to the stem module 30 at different insertion depths of the insertion part 31.

For fastening and fixing cockpit modules 3 and 4 to each other, fastening holes 34 are designed in the insertion part 31, which are provided here as threaded holes. In the handlebar module 40, 46 fastening holes or fixation holes 44 are designed in corresponding areas of the base body, which are aligned in such a way that they align with the fastening holes 34 on the insertion part 31 at the appropriate insertion depths.

This allows a screw 15 to be inserted through the fixation hole 44 and screwed with a thread in the fastening hole 34. This allows the cockpit unit to be mounted in two different operating geometries, depending on the selection of a fastening hole 34, to allow for different seating positions.

Preferably, the fixation holes 44 are accessible from below when assembled and installed on a bicycle 100 as intended so that when viewed from the normal riding position from above, there is a flat and/or undisturbed surface of the handlebar module 40 (by the fasteners).

Fastening holes 34, 44 can also be designed as through holes. Then screws or rivets are inserted through. It is also possible to use blind holes and glued pins.

A width 31*b* of the insertion part is preferably greater than ⅓ or half of a width 30*b* of the stem module 30. Likewise, a length 31*a* of the insertion part is preferably greater than ⅓ or half of a length 30*a* of the entire stem module 30. The length 42*a* and the width 42*b* of the receptacle part inside the base body 46 of the handlebar module 40 are adapted to the corresponding dimensions of the insertion part 31 so that, in particular, a precise insertion is possible. In particular, low tolerances are chosen so that insertion is possible but simultaneously a positive-locking connection is provided.

The insertion part 31 has lateral guide, reinforcement or stiffening elements 35. The stiffening elements or guide elements 35 are designed here as guide bars and, when assembled, engage with guide elements 45 in the cockpit module 40.

Figure 6:
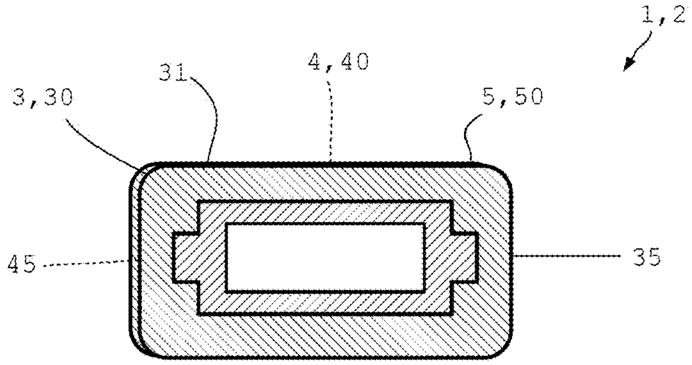
FIG. 6 a schematic cross-section through a bicycle component according to the invention.

FIG. 6 shows a strongly schematic cross-section through a middle section of cockpit unit 2. Here, between cockpit modules 3 and 4, cockpit module 5 is included. The cut cockpit modules 3 and 5 are shown in a schematic way. A dashed reference number line is drawn toward a cockpit module 4. The cross-section of cockpit module 5 drawn with shading can (particularly preferably) correspond exactly to the cross-section of cockpit module 4, which is slightly offset in the longitudinal direction. This results in a completely uniform appearance of cockpit unit 2. Where applicable, there can be a separation joint or a separation groove in the lower area of cockpit module 5. Or cockpit module 5, for example, is manufactured in two parts (see FIG. 8).

The cockpit module 3 engages with cockpit module 4 in the assembled state. Insertion part 31 engages with receptacle part 42 in a positive-locking manner. Insertion part 31 penetrates cockpit module 5.

Here in FIG. 6, the stiffening elements or guide elements 35, 45 are visible. Here, the guide elements 35 project laterally outwards from the insertion part 31 and (finally) engage positive-locking into guide elements 45 in cockpit module 4. The interlocking guide elements 35, 45 achieve a considerable stiffening of the cockpit unit 2. The guide elements 35, 45 can also be referred to as stiffening elements. The guide elements 35 are designed here as guide bars and the guide elements 45 are designed as guide grooves. An inverted embodiment is also possible and also serves as a stiffening reinforcement. Preferably, corresponding guide grooves are also designed in the cockpit module. Such guide grooves are shown in FIG. 6.

FIG. 7*a* shows a variant in which (schematically indicated) separate sets of handlebars 47 are attached or inserted on the right and left in a receptacle 48 inside the base body 46 of the handlebar module. By removing the sets of handlebars 47 and mounting other sets of handlebars 47, their length and geometry can be changed. This also allows the handlebar width and angle of the handlebar end pieces to be varied. The (one-time) insertion can be done at the factory, for example, and allows the number of tools to be reduced. Where applicable, the insertion and adjustment can also be carried out at the customer's site or in a specialist company in order to enable modular adaptations to requirements and (changed) preferences. Guide elements can be provided to ensure that the mounting bracket is fixed.

The two cockpit modules 30 and 40 are bolted together here in the shortest relative position 10. This results in a relative position 10, in which the insertion part 31 is inserted as deep as possible into the receptacle part 42 in the base body 46.

FIG. 7*b* shows a more extended position and operating geometry 21, where the two cockpit modules 3 and 4 are further apart in a relative position 11. Between the two cockpit modules 3 and 4, the dashed cockpit module 5 can be seen, which here surrounds the non-inserted part of the insertion part 31, resulting in a uniform exterior design.

FIGS. 8*a*-8*c* show in a schematic illustration 3 different embodiments of a cockpit module 5 or an intermediate module 50, which has a housing 56 here. The housing 56 can be designed in two parts and comprise two housing parts 56*a* and 56*b* that are locked or connected or glued together, for example.

As shown in FIG. 8*a*, cockpit module 5 can be shaped on the inside in a C-shape so that a groove or an aperture results at the bottom, particularly in the installed state, wherein the cockpit module 5 can imposed on by a cable, for example, or brought over it by elastic deflections.

Inside one of the cockpit modules 3, 4 or 5, the cable guide 6 shown here as an example in FIG. 8*a* can be provided, which, for example, reliably accommodates a cable routed inside the cockpit unit via holders 6*a* and 6*b*. This allows a length compensation to be achieved, in which cable 7 is initially laid in a zigzag or in serpentine lines and held at holders 6*a*, 6*b*. This prevents rattling during operation. If the cockpit module 4 is to be extended, a sufficient cable length is available.

Figure 9A:
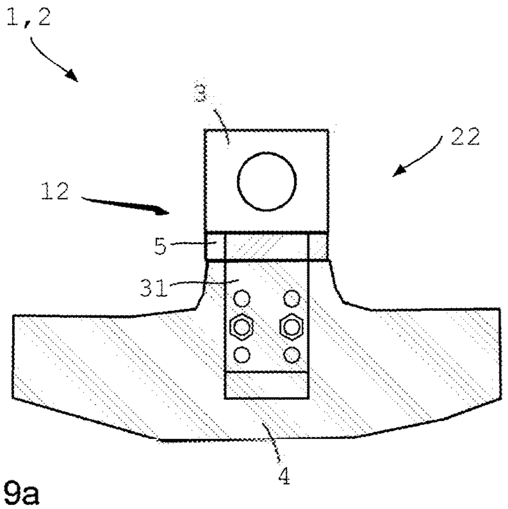
FIGS. 9*a*-9*b* a bicycle component according to the invention in two different relative positions.

FIG. 9*a* shows a variant that allows three different insertion positions, wherein in the illustrated variant cockpit unit 2 is located in the intermediate position 12. For this purpose, a shorter cockpit module 5 is inserted between cockpit modules 3 and 4.

Figure 9B:
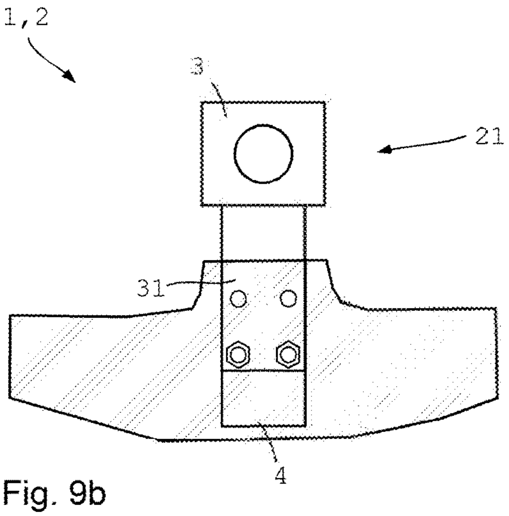

In FIG. 9*b*, the cockpit unit 2 is located in the relative position 11, wherein the cockpit module 5 was (initially) omitted during assembly, for example, to test the operating geometry 21 first.

Figure 10A:
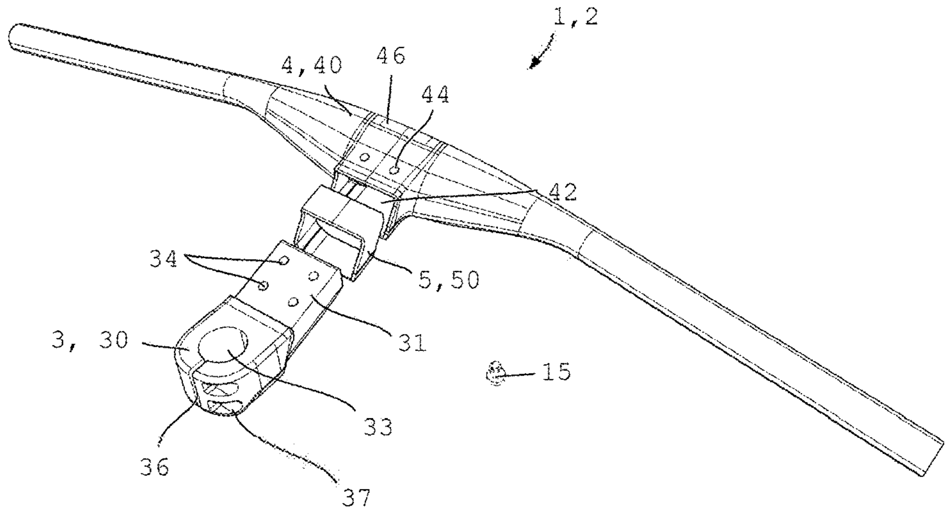
FIGS. 10*a*-10*c* perspective exploded illustrations of three variations of a bicycle component according to the invention.
Figure 10B:
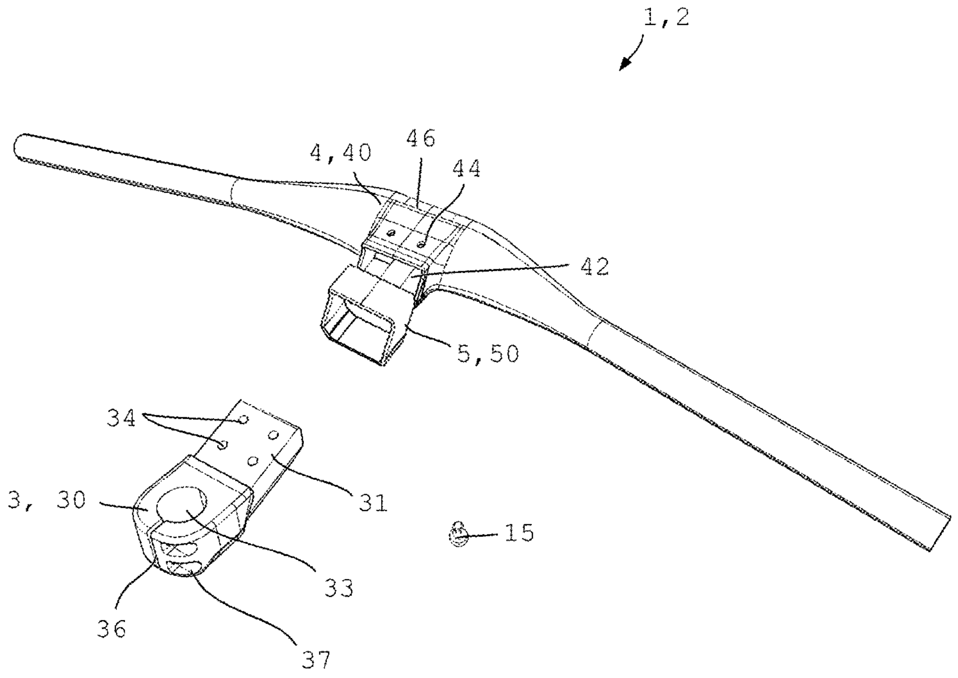
Figure 10C:
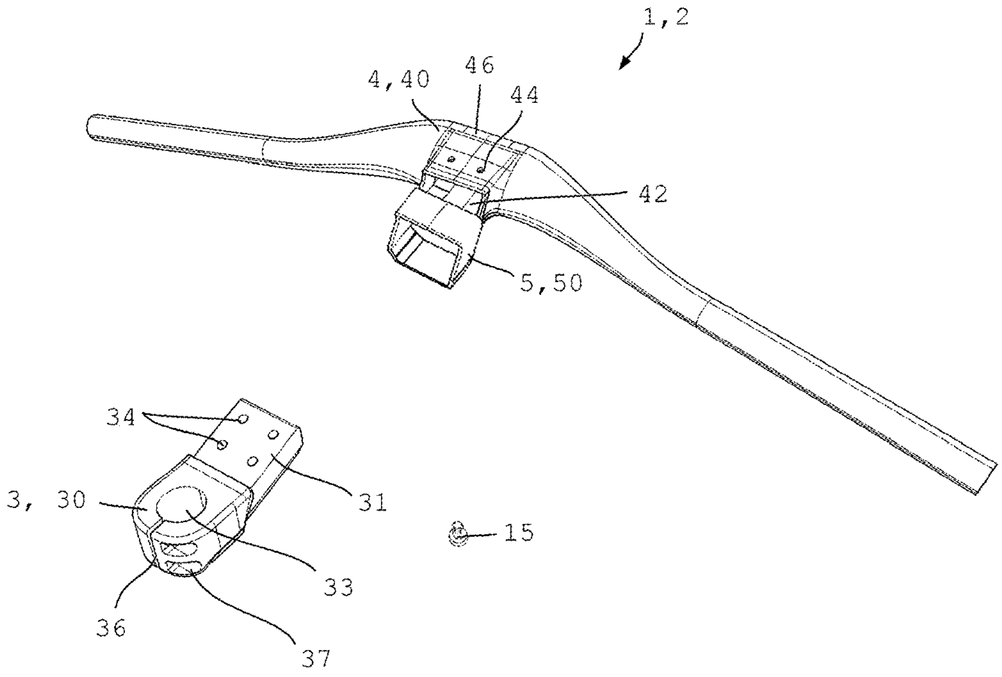

FIGS. 10*a*-10*c* show a perspective exploded illustration of a cockpit unit 2 as bicycle component 1, wherein the slot 36 in the stem module 30 and screw receptacle 37 for clamping the clamping section 33 can be recognized. The threaded fastening holes 34 and the fixation holes 44 on the handlebar module 40 are also evident. Screws 15 are for fixation. As an example, three different handlebar modules 40 are shown. The cockpit module 50 is only needed if the cockpit unit 2 is mounted in a longer operating position.

Figure 11:
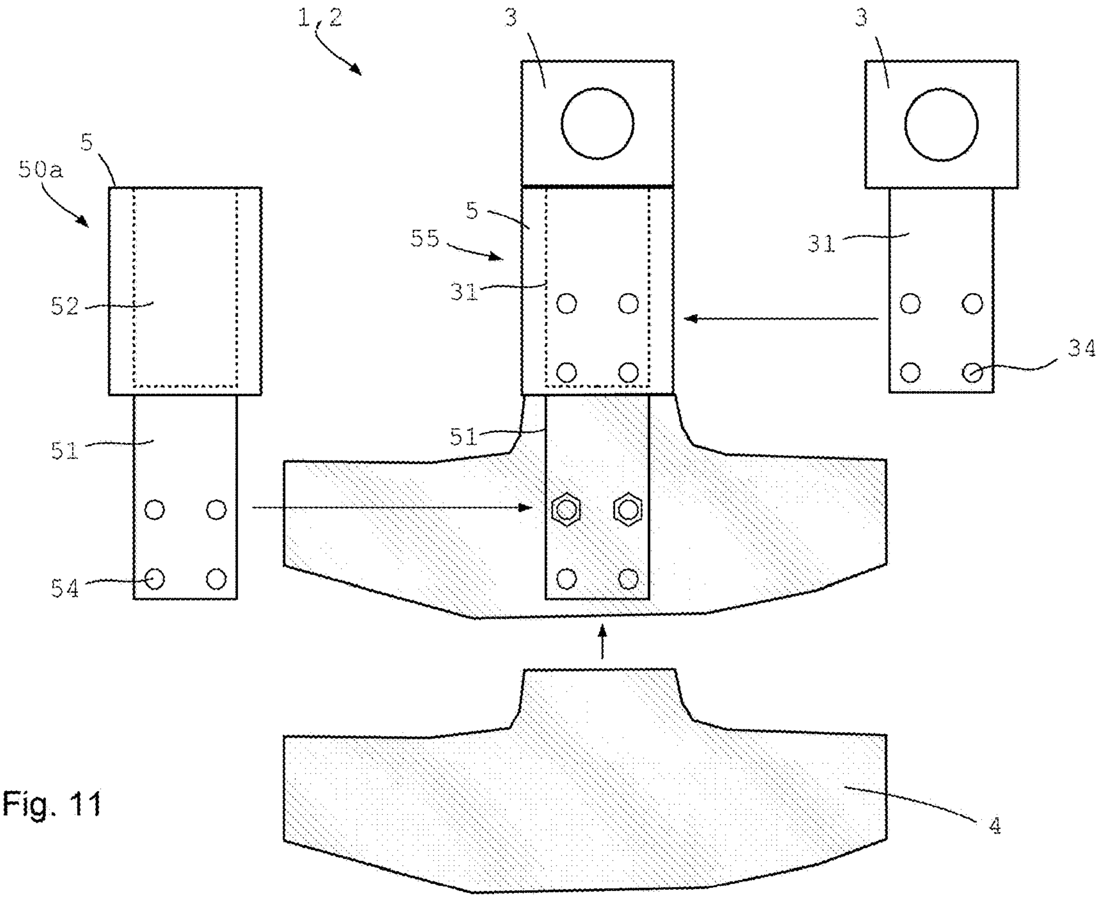
FIG. 11 a further schematic illustration of yet another bicycle component according to the invention.

FIG. 11 shows a variant of the bicycle component 1, wherein the stem module 30 comprises an insertion part 31 and wherein the handlebar module 40 comprises a receptacle part 42, the dimensions of which are adapted to the dimensions of the insertion part 31. The third cockpit module 5 surrounds the insertion part 31 of one cockpit module 3 in sections and plunges into the receptacle part 42 of the other cockpit module 4.

The third cockpit module 5 comprises an insertion part 51 for insertion into another cockpit module 4 or 3 and a receptacle part 52 for accommodating an insertion part 31 of a further cockpit module 3, 4. Here, the insertion part 31 is inserted into the receptacle part 52 and the insertion part 51 of the cockpit module is inserted into the receptacle part 42. The cockpit modules are connected to each other via screws 15.

The third cockpit module 5 can change an orientation (angle, height) of the first cockpit module 3 relative to the second cockpit module 4. The third cockpit module 5 can be dispensed with if necessary or a third cockpit module 5 with different dimensions (longer, different angle, etc.) can be used.

Figure 12A:
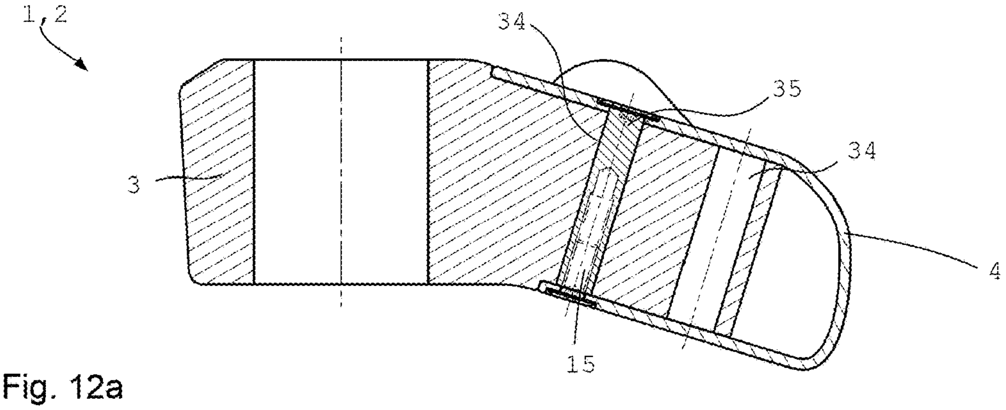
FIG. 12 a-c three embodiments of a bicycle component according to the invention in a sectional view.
Figure 12B:
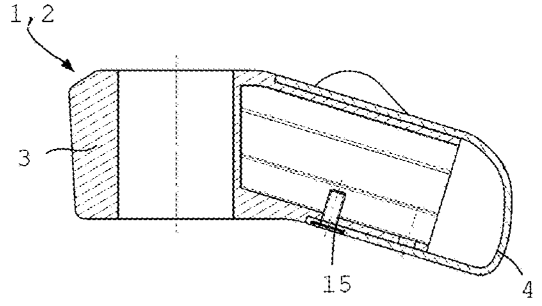
Figure 12C:
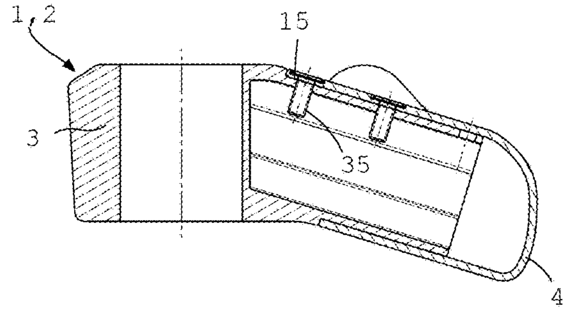

FIGS. 12*a* to 12*c* show three different embodiments in a schematic lateral view. In FIG. 12*a*, a sleeve 35 is included in a cockpit module, which has an internal thread. A screw 15 is screwed into the internal thread. The sleeve 35 is inserted into the fastening hole 34 of the corresponding cockpit module without play. If necessary, the sleeve 35 can be inserted into another fastening hole. It is also possible that a thread is formed in a core material of a cockpit module.

FIGS. 12*b* and 12*c* show variants in which a blind hole is available as a fastening hole. Then the screw 35 does not extend completely through the cockpit module. The screw 15 is screwed into the thread in the blind hole. The thread can be formed in a separate sleeve 35. The thread can also be laminated.

In all embodiments, the fastening holes and the fixation holes are aligned transversely to a longitudinal extension 8. In all embodiments, it is particularly preferred if the fastening holes and the fixation holes run in a vertical direction when the steering device is used as intended. The angle can be inclined to the vertical direction but preferably less than 45°.

In particular, the cockpit modules are adapted to each other and pushed into each other in such a way that a precise hold is established. This preferably already ensures that a twist relative to each other is not possible. In all embodiments, it is particularly preferred if the receptacle holes of the fastening screws are designed to be completely closed.

A considerable advantage of the invention is that even with a possible loss of some screw tension, the stability does not change and is completely preserved. This is because the screw tension in the invention is not aligned in the direction of connection of the cockpit modules.

Overall, the invention provides a modular cockpit or a modular bicycle component, in which a high variety of variants and a high number of mounting and relative positions are provided with a small number of tools and a small number of different cockpit modules. This allows different seating positions to be made possible or the cockpit unit to be adapted to different riders. In variants, it is possible for the end customer to change the position and geometry afterwards. The end customer can vary the design without having to buy all the new parts right away.

Different variants can be produced more cost-effectively. Where applicable, it is possible to change the operating position and operating geometry without the use of other (additional) parts. The result is an appealing look that looks like a one-piece cockpit unit. By using "spacers" as cockpit modules, different dimensions can be achieved. Conversion is easy. In many cases, wires or cables do not have to be removed.

Through different adjustments and settings, an adjustment range of a cockpit unit length of 10 mm, 20 mm or even 30 mm can be achieved. Larger areas of customization are possible.

In principle, it is possible that the stem module has an insertion part that is inserted into a receptacle part of the handlebar module. However, it is also possible for the handlebar module to include an insertion part, which is inserted into a corresponding receptacle part of the stem module. Easy adjustment is possible by mounting and fixing by screws, rivets or gluing at different depths.

The bicycle component or its parts can be ridden in the cross-country sector, in the road bike sector and also in the trail sector.

While a particular embodiment of the present bicycle component with a cockpit unit have been described herein, it will be appreciated by those skilled in the art that changes and modifications may be made thereto without departing from the invention in its broader aspects and as set forth in the following claims.

REFERENCE LIST

1 cockpit
2 cockpit unit
3 cockpit module
4 cockpit module
5 cockpit module
6 cable guide
**6*a*** holder
**6*b*** holder
7 cable
8 longitudinal direction
9 transverse direction
10-12 relative position, insertion position
15 fastening part, screw
20-22 operating geometry
30 stem module
**30*a*** length
**30*b*** width
31 insertion part
**31*a*** length
**31*b*** width
33 clamping section
34 fastening hole, threaded hole
35 sleeve
36 slot
37 screw receptacle
40 handlebar module
42 receptacle part
**42*a*** length
**42*b*** width
44 fastening hole, fixation hole
45 handlebar device
46 base body
47 set of handlebars
48 receptacle for 47
50 intermediate module
**50*a*** intermediate piece
51 insertion part
52 receptacle part
54 fastening hole, threaded hole
55 spacers
56 housing
**56*a*** housing part
**56*b*** housing part
100 bicycle
101 wheel, front wheel
102 wheel, rear wheel
103 frame
104 fork, suspension fork
105 rear dampers
107 saddle
109 spoke
110 rim
111 sprocket device
112 crank

The invention claimed is:

1. A bicycle component for at least partially muscle-driven bicycles comprising: a cockpit unit with at least two cockpit modules successively arranged in a longitudinal direction; wherein a first cockpit module is designed as a stem module and wherein a second cockpit module is designed as a handlebar module;

wherein the cockpit modules can be coupled differently with each other in order to enable different operating geometries of the cockpit unit on a bicycle;

wherein at least one of the cockpit modules comprises an insertion part, and at least one of the cockpit modules comprises a receptacle part, and that the insertion part can be inserted into the receptacle part and can be coupled/connected to the insertion part in at least two different relative positions in order to provide at least two different operating geometries with the cockpit unit by assembling differently;

the insertion part and the receptacle part each comprise at least two fastening holes arranged transversely in the transverse direction offset from the longitudinal direction for fastening by means of a fastening part; and at least one of the insertion part and the receptacle part comprises at least two fastening holes arranged offset in the longitudinal direction for fastening by means of the fastening part, and wherein at least one cockpit module is made of fibre composite.

2. The bicycle component according to claim 1, wherein a third cockpit module is arranged between the first and the second cockpit module and wherein the third cockpit module surrounds the first and/or the second cockpit module in sections and wherein the third cockpit module forms a spacer between the first and the second cockpit module and the positioning of the cockpit modules relative to each other.

3. The bicycle component according to claim 2, wherein the third cockpit module comprises a two-part housing, wherein the housing parts are connected to each other and are latched.

4. The bicycle component according to claim 1, wherein at least one cockpit module comprises at least one cable guide and wherein the cable guide allows a length compensation of a cable between the relative positions.

5. The bicycle component according to claim 2, wherein the third cockpit module is C-shaped.

6. The bicycle component according to claim 1, wherein at least two cockpit modules are glued together.

7. The bicycle component according to claim 1, wherein at least two cockpit modules are bolted together.

8. The bicycle component according to claim 1, wherein at least two cockpit modules are coupled to each other in a positive-locking manner.

9. The bicycle component according to claim 8, wherein at least one cockpit module comprises a guide bar which projects from the cockpit module and engages with a guide groove of another cockpit module when connected as intended.

10. The bicycle component according to claim 1, wherein at least one fastening hole is formed as a threaded hole and wherein the fastening part comprises a thread.

11. The bicycle component according to claim 10, wherein two rows of two parallel threaded holes) are formed in at least one cockpit module.

12. The bicycle component according to claim 1, wherein two rows of two parallel fastening holes are formed in the insertion part and wherein two parallel fixation holes are formed in the receptacle part at the same axial height.

13. The bicycle component according to claim 1, wherein a length of the insertion part of a cockpit module is greater than ⅓ of a length of the cockpit module and wherein a width of the insertion part of a cockpit module is greater than ½ of a width of the cockpit module.

14. The bicycle component according to claim 1, wherein the handlebar module forms at least one base body of a handlebar device and wherein the handlebar module comprises at least one set of handlebars which is formed as a single piece on the handlebar module or is accommodated on a receptacle.

15. The bicycle component according to claim 1, wherein the stem module comprises a clamping portion for attachment to a steerer tube of a bicycle fork.

16. The bicycle component according to claim 1, wherein the stem module comprises an insertion part and wherein the handlebar module comprises a receptacle part, the dimensions of which are adapted to the dimensions of the insertion part.

17. The bicycle component according to claim 2, wherein the third cockpit module surrounds the insertion part of one cockpit module in sections and plunges into the receptacle part of the other cockpit module, and wherein the third cockpit module is an insertion part for insertion into another cockpit module and a receptacle part for accommodating an insertion part of another cockpit module.

18. The bicycle component according to claim 2, wherein the third cockpit module changes an orientation of the first cockpit module relative to the second cockpit module.

19. The bicycle component according to claim 1, wherein the cockpit unit comprises cockpit modules of different ASTM classes.

20. A bicycle component for at least partially muscle-driven bicycles comprising:

a cockpit unit with at least two cockpit modules successively arranged in a longitudinal direction; wherein a first cockpit module is designed as a stem module and wherein a second cockpit module is designed as a handlebar module;

wherein the cockpit modules can be coupled differently with each other in order to enable different operating geometries of the cockpit unit on a bicycle;

wherein at least one of the cockpit modules comprises an insertion part, and at least one of the cockpit modules comprises a receptacle part, and that the insertion part can be inserted into the receptacle part and can be coupled/connected to the insertion part in at least two different relative positions in order to provide at least two different operating geometries with the cockpit unit by assembling differently;

the insertion part and the receptacle part each comprise at least two fastening holes arranged transversely in the transverse direction offset from the longitudinal direction for fastening by means of a fastening part; and at least one of the insertion part and the receptacle part comprises at least two fastening holes arranged offset in the longitudinal direction for fastening by means of the fastening part, and wherein at least two cockpit modules are glued together.

21. A bicycle component for at least partially muscle-driven bicycles comprising:

a cockpit unit with at least two cockpit modules successively arranged in a longitudinal direction; wherein a first cockpit module is designed as a stem module and wherein a second cockpit module is designed as a handlebar module;

wherein the cockpit modules can be coupled differently with each other in order to enable different operating geometries of the cockpit unit on a bicycle;

wherein at least one of the cockpit modules comprises an insertion part, and at least one of the cockpit modules comprises a receptacle part, and that the insertion part can be inserted into the receptacle part and can be coupled/connected to the insertion part in at least two different relative positions in order to provide at least two different operating geometries with the cockpit unit by assembling differently;

the insertion part and the receptacle part each comprise at least two fastening holes arranged transversely in the transverse direction offset from the longitudinal direction for fastening by means of a fastening part; and at least one of the insertion part and the receptacle part comprises at least two fastening holes arranged offset in the longitudinal direction for fastening by means of the fastening part and wherein the cockpit unit comprises cockpit modules of different ASTM classes.

* * * * *